Patented Jan. 5, 1937

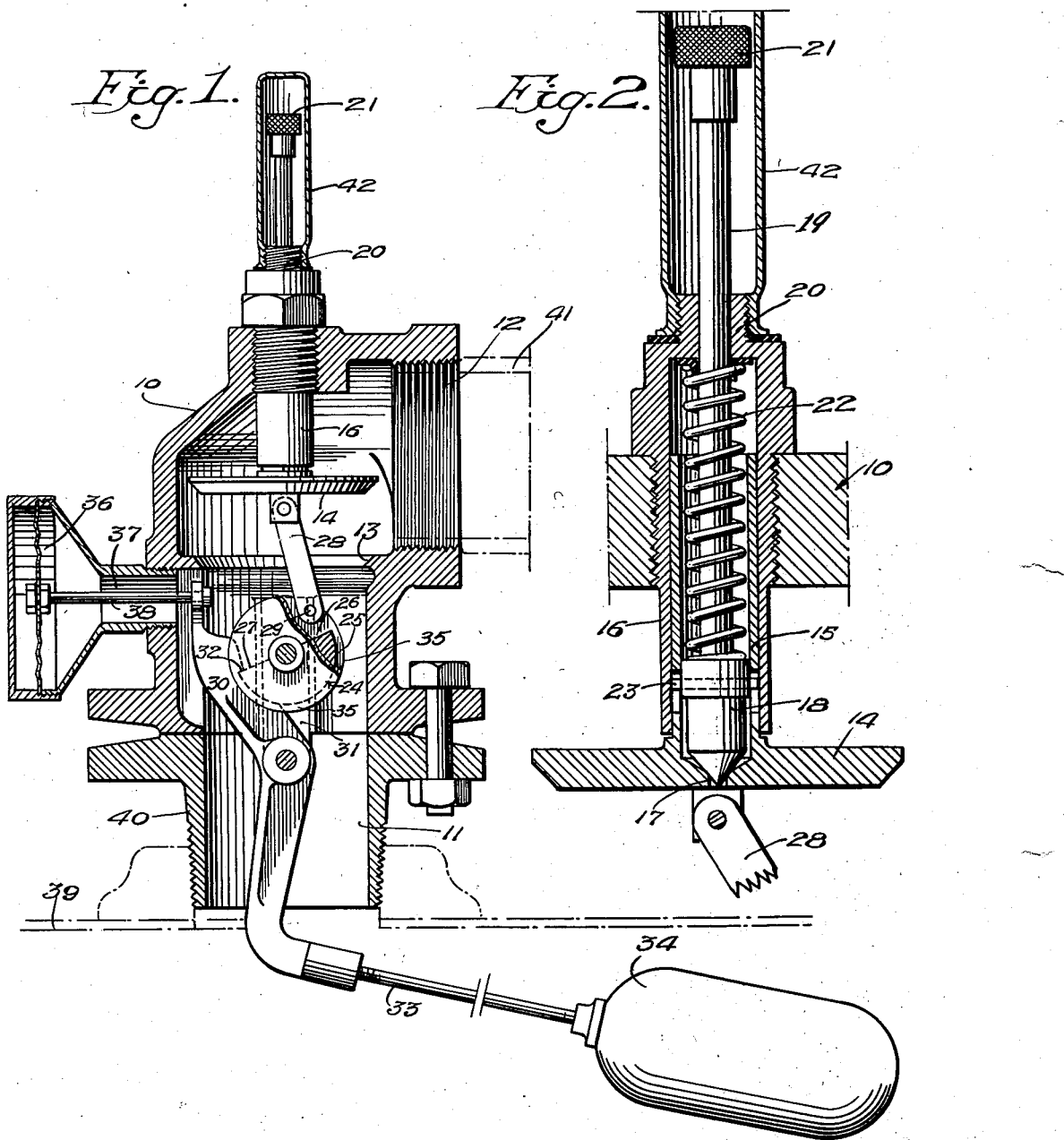

2,066,315

UNITED STATES PATENT OFFICE 2,066,315

TANK SAFETY VALVE

Henry C. Bauer and George R. Parker, Philadelphia, Pa., assignors to William D. Battersby, Fort Washington, Pa.

Application June 28, 1934, Serial No. 732,943

1 Claim. (Cl. 137—68)

This invention relates to valves, and more particularly to a safety valve for domestic fuel tanks. The fuel tanks of domestic burners are constructed of relatively light gauge material and are ordinarily only tested for about 10 pounds pressure. Each tank is equipped with a filling opening and a vent, the vent conducting fumes from the tank to the exterior of the building in which the tank is arranged. While these vents are screened, due to the fact that the tanks are not in use other than very moderately at the best during the summer months, these vents often become closed. Insects build their nests on the screened outlets, blocking the same, and foreign matter such as dirt or snow and ice often serve to block the same. When this occurs and an attempt is made to fill the tank, the tank is subjected to dangerous pressures and often breaks with the result that many unnecessary fires occur. The pressure at which the fuel is delivered to the tank is approximately 30 pounds, so that this pressure dangerously exceeds the pressure to which the tank has been tested. Furthermore, in filling the tank, due to the fact that the tank is usually disposed in the cellar of the dwelling and the filling opening is at the exterior of the building, it is often difficult for the operator of the tank truck to determine when the tank has been filled, with the result that the tank overflows and thus creates a dangerous condition.

Important objects of the present invention are the provision of a safety valve for disposition in the filling line, which valve is so arranged that it will be closed either by the generation of a predetermined pressure in the tank or by a rise in the fluid level in the tank beyond the predetermined point.

Other objects of the invention are the provision of a construction of this character which may be readily applied to the tank, taking the place of the elbow ordinarily employed at the junction of the tank and filling line; the provision of a valve which will, of itself, operate as a safety valve opening to permit the escape of fluid pressure in event such pressure is generated while the tank is closed by the valve and a filling operation is not in progress; and the provision of a valve which, while operable to discontinue flow into the tank when the level has reached a predetermined level less than the complete content of the tank so that the filling will be discontinued, may be subsequently opened to permit the fuel which is contained in the filling line to pass to the tank so that the filling line is clear, and the provision of a valve which may be readily and cheaply manufactured and which is durable and efficient in service.

These and other objects we attain by the construction shown in the accompanying drawing wherein, for the purpose of illustration, we have shown a preferred embodiment of our invention and wherein:

Fig. 1 is a sectional view in elevation, illustrating the valve in its open position; and Fig. 2 is an enlarged sectional view showing the valve stem construction.

Referring now more particularly to the drawing, the numeral 10 generally designates a valve casing having substantially the conformation of an elbow having a downwardly directed outlet 11 and a horizontally directed inlet 12. Between the inlet and outlet, and facing the former, is a valve seat 13 with which a valve 14 co-acts. This valve comprises a hollow stem 15 slidably mounted in a suitable guide 16. The bore of the hollow stem is in communication with the bottom face of the valve through a small port 17 and mounted within the hollow stem is a needle valve 18, the stem 19 of which projects upwardly through a suitable packed bearing 20 in the upper end of the guide 16 and has at its upper end a head 21 by means of which it may be readily grasped. A spring 22 extending between the bearing 20 and the needle valve urges the needle valve downwardly and, accordingly, acts to urge valve 14 downwardly. The needle valve has pin-and-slot engagement at 23 with the valve 14, and more specifically its stem 15, of such character that a pull exerted upon head 21 will first serve to unseat the needle valve and then to elevate valve 14.

A member 24 is rotatably mounted within the valve casing 10 beneath seat 13, this member being at present shown as in the form of a disc having a peripheral groove 25 which is abruptly deepened at 26 to provide a radial latch shoulder 27. Pivotally connected to the lower surface of the valve is a link 28 which is, in turn, connected to the member 24 at the opposite side of a vertical plane including the axis thereof from the shoulder 27 as indicated at 29. Obviously, if the member 24 is free to rotate, the spring 22 urging valve 14 downwardly will act through this link to rotate the member and cause shoulder 27 to move upwardly. Such movement is, however, prevented through latch mechanism comprising a lever 30 mounted on suitable supports 31 carried by the valve casing and having adjacent its upper end a projecting latch lug 32 to engage over shoulder 27. The lower end of this lever has an outwardly and downwardly-extending rod 33 secured thereto, the outer end of this rod being equipped with a float 34 which is of sufficient weight to constantly serve to rotate lever 30 in a direction forcing the lower end thereof into engagement with the member 24. Adjacent the member 24, the lever is so formed that it fits between the flanges 35 provided by the grooving of the member 24 so that accidental displacement of the lever is prevented. Opposing the rear face of the upper end of the lever 30 is a flexible diaphragm 36 subjected to pressures within the casing and beneath the seat through a port 37. This diaphragm is link-connected to the upper end of the lever as at 38.

In use of the device, the outlet end of the casing is connected with the tank 39 through any suitable fitting such as that indicated at 40, the float 34 being disposed within the tank and so arranged therein that when it has been elevated by a change in fluid level to a sufficient extent to disengage latch lug 32 from shoulder 27 and thus permit valve 14 to close, the tank will not be entirely filled. It will be obvious, if during a filling operation the level reaches a predetermined point, the elevation of the float will release this shoulder permitting the valve to close with the result that the filling is immediately stopped. At this time, however, the tank wagon would still be connected with the filling pipe 41 and the filling pipe would be completely filled. Discontinuation of the flow would, however, advise the attendant that the tank was full, enabling him to close the tank valve, after which the filling line can be drained by re-opening valve 14 and holding it in its open position until the drainage is completed which, due to the size of the lines employed, will require but a few seconds. In this connection the provision of the vent 17 may be very important, since, as hereinbefore stated, the filling pressure is ordinarily about 30 pounds and the valve 14, which is relatively large, will be subjected to such pressure. In event the vent of the tank has become clogged for any reason and, accordingly, a dangerous pressure is generated in tank 39 during the filling operation, the diaphragm 36 will act through link 38 to withdraw latch lug 32 and permit valve 14 to close. Since the sight glass of the tank, with which such tanks are usually equipped, shows that the tank is not full, the attendant in charge of filling the tank will be apprised that the tank is not venting properly and may seek and cure the trouble.

It will also be obvious that in event the vent of the tank becomes clogged for any reason, when the tank is full or partially full and a dangerous pressure is generated within the tank as, for example, by over-heating thereof, this pressure will act to unseat valve 14. In order to prevent tampering, the upper end of the needle valve stem and its head are preferably closed with a suitable cap generally designated at 42.

Since the construction illustrated is, obviously, capable of considerable modification without in any manner departing from the spirit of our invention, we do not wish to be understood as limiting ourselves thereto except as hereinafter claimed.

We claim:

In a valve of the type described, a casing having an inlet and an outlet, a valve seat facing the inlet, a valve coacting therewith and normally engaged with the seat, a rotatable member below said seat and having a shoulder, a latch lever pivoted in the casing and having a lug engaging said shoulder to prevent rotation of the member in one direction, a link connecting the valve and member and having engagement with the member tending to rotate the member in said direction when the valve moves toward its seat and in the opposite direction as the valve moves from its seat, and a float on one end of said lever to shift the lever and disengage said lug.

HENRY C. BAUER.
GEORGE R. PARKER.